United States Patent [19]

Novak et al.

[11] 4,360,733
[45] Nov. 23, 1982

[54] WINDOW ASSEMBLY FOR A DEEP WELL SCINTILLATION DETECTOR

[75] Inventors: William P. Novak, Middlefield; Ival Toepke, Newbury; John White, Chagrin Falls, all of Ohio

[73] Assignee: Bicron Corporation, Newbury, Ohio

[21] Appl. No.: 185,292

[22] Filed: Sep. 8, 1980

[51] Int. Cl.³ .................................................. G01T 1/20
[52] U.S. Cl. ................................. 250/361 R; 250/368; 250/485.1
[58] Field of Search ..................... 250/361 R, 368, 485

[56] References Cited

U.S. PATENT DOCUMENTS

| 3,426,195 | 2/1969 | Menefee et al. | 250/485 |
| 3,917,950 | 11/1975 | Carlson | 250/368 X |
| 4,004,151 | 1/1977 | Novak | 250/485 |
| 4,158,773 | 6/1979 | Novak | 250/368 X |

*Primary Examiner*—Davis L. Willis

*Attorney, Agent, or Firm*—Pearne, Gordon, Sessions, McCoy & Granger

[57] ABSTRACT

A circular glass window in the form of a shallow, truncated cone having parallel faces is nested within and equidistantly spaced from a metal retaining ring defining at its inner periphery a shallow, tapered, smooth-wall bore having a sloped sidewall to which the correspondingly sloped edge of the glass window is bonded by a thin layer of epoxy adhesive composition constituting an annular hermetic seal of constant predetermined thickness for optimum strength. The retaining ring, with the glass window mounted therein, is welded to the end of a tubelike metal housing containing a cylindrical scintillation crystal coaxially mounted therein, the larger diameter base end or inner face of the truncated, cone-shaped window being optically coupled to and adjacent one end of the crystal. The crystal is biased toward the inner face of the window to apply an evenly distributed compression force to the annular epoxy-formed seal to aid in maintaining its hermetic integrity under adverse temperature conditions.

10 Claims, 2 Drawing Figures

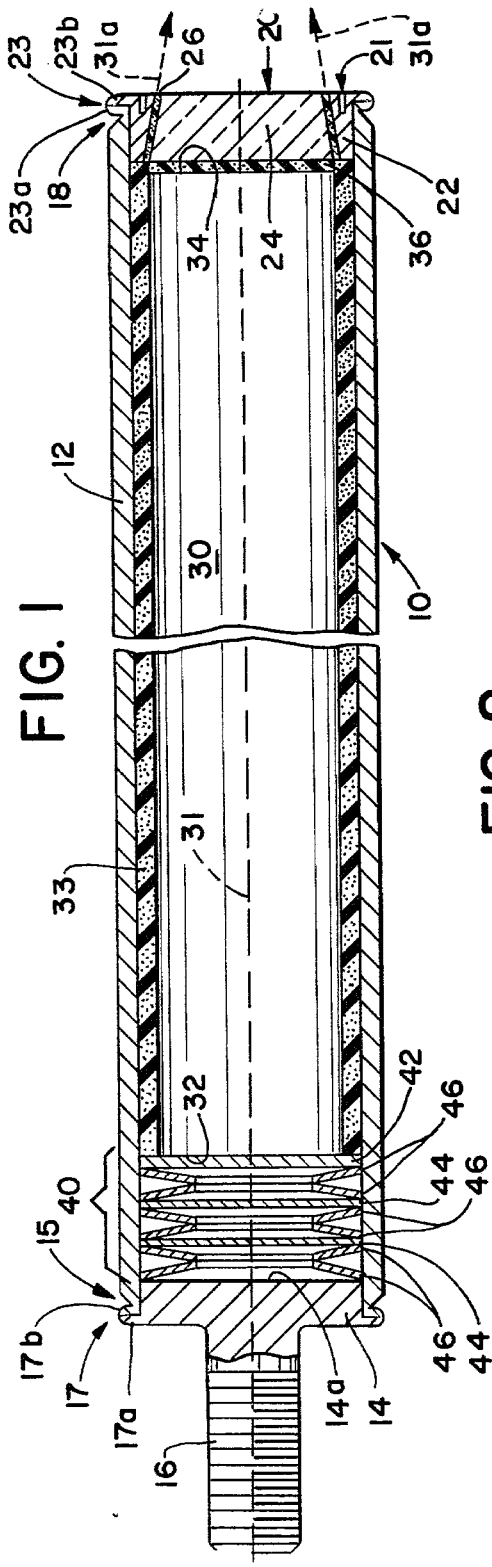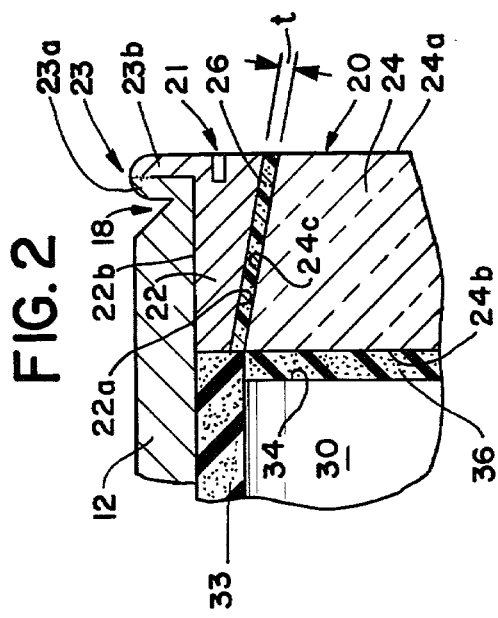

WINDOW ASSEMBLY FOR A DEEP WELL SCINTILLATION DETECTOR

BACKGROUND OF THE INVENTION

The present invention relates to scintillation detectors for measuring ionizing radiation at successive depths of bore holes in the earth, and more particularly to an improved scintillation detector window assembly better able to withstand adverse operating conditions than detector window assemblies of the prior art.

U.S. Pat. No. 4,004,151, assigned to the assignee of the present application and incorporated herein in its entirety by reference, discloses a frustoconical glass window set large face first into the machined end of the tubular detector casing and bonded to it by an epoxy adhesive composition that establishes a relatively thick, annular, hermetic seal of varying wall thickness between the window and the machined end of the detector case.

While a detector in accordance with U.S. Pat. No. 4,004,151 represents a substantial improvement over earlier scintillation detectors of the subject type, failure of its window assembly, though infrequent, has occurred under adverse operating conditions including high temperature (150°-200° C.).

It has been determined by investigation that increased heating of the cylindrical scintillation crystal, coaxially mounted within the tubular detector case, as it is lowered into a bore hole causes longitudinal expansion of the crystal, which in turn applies a compressive force to the inner face of the window, in addition to a normal biasing force. If the additional force applied by the expanding crystal is high enough, the epoxy adhesive composition sealing annulus bonding the glass window to the machined end of the detector case may fail, such as by cracking, wherein the hermetic containment of the hygroscopic crystal will be lost, resulting in eventual failure of the detector.

The desire to improve the window assembly of the detector illustrated by U.S. Pat. No. 4,004,151, together with the belief that failure of such a prior art epoxy-bonded window assembly was possibly due to undesirable aspects of the window-seal-casing interface geometry, led to the present invention.

SUMMARY OF THE INVENTION

The present invention provides an improved scintillation detector window assembly having a window retaining ring with an inner diameter surface defining a tapered smooth-wall bore. A window, generally transparent to light generated by the associated scintillation crystal under bombardment from ionizing radiation, is provided in the form of a shallow truncated cone nested within the tapered bore of the retaining ring. The window has circular faces parallel to each other, one face having a diameter larger than the other, the peripheries of the faces being separated by an edge wall surface equidistantly spaced at all points from the inner diameter surface defining the tapered smooth-wall bore of the retaining ring. In further accordance with the invention, the diameter of the larger face of the window is greater than the smallest diameter of the tapered smooth-wall bore of the retaining ring. An epoxy adhesive composition fills at least an annular portion of the space between the edge wall surface of the window and the inner diameter surface of the tapered smooth-wall bore to hermetically bond and seal the window to the retaining ring.

In a preferred form, the constant wall thickness of the epoxy adhesive composition between the retaining ring and the window nested within and equidistantly spaced from it is in the range of 0.010 to 0.040 of an inch to optimize the strength capabilities of the epoxy adhesive composition utilized.

Upon application of a compressive force to the larger diameter side of the window, the epoxy adhesive composition is generally evenly compressed throughout to aid in maintaining its hermetic integrity.

BRIEF DESCRIPTION OF THE DRAWINGS

Other objects and a fuller understanding of the invention may be had by referring to the following description and claims, taken in conjunction with the accompanying drawing, wherein:

FIG. 1 is a foreshortened, longitudinal, cross-sectional view of a scintillation detector including an improved window assembly according to the present invention; and FIG. 2 is a fragmentary, cross-sectional view of FIG. 1, showing an enlarged portion of the improved window assembly on a larger scale.

DETAILED DESCRIPTION OF THE PREFERRED EMBODIMENT

Turning to FIG. 1, there is illustrated, in accordance with the present invention, a scintillation detector 10 adapted to be inserted in and lowered down a deep well bore in the earth. The scintillation detector 10 includes a tubular metal housing or case 12 having one of its ends hermetically closed by an end cap 14 which includes a mounting stud 16 extending therefrom along the longitudinal axis of the case 12. It is noted that in many detector applications the mounting stud 16 is unnecessary and can therefore be deleted, the mounting studs 16 forming no part of the present invention. The other end of the case 12 is hermetically closed by a window assembly 20, including a window-retaining ring 22 within which is nested a window 24, the window 24 being hermetically bonded to the window-retaining ring 22 by an epoxy adhesive composition 26 constituting an annular frustoconical seal between the glass window 24 and the retaining ring 22, such seal to be explained in more detail with regard to FIG. 2.

The case 12 and the end cap 14 are made of a corrosion-resistant metal and are preferably made of a standard austenitic stainless steel or equivalent. The metal of these parts should have a coefficient of thermal expansion in the range of from about 12 to about 18 times $10^{-6}$ inch per inch per degree centigrade. The metal may, for example, be type 304 or 316 stainless steel with a coefficient of thermal expansion of around 0.000016 of an inch per inch per degree centigrade. Titanium alloys and other corrosion-resistant metals may also be used but are not, insofar as applicants now know, available as standard commercial tubing. Plated low carbon steel may also be used. The degree of corrosion resistance should be sufficient to protect against the environment in which the unit is employed.

The window assembly 20 and the end cap 14 are fastened in hermetic sealing relation to their respective ends of the tubular case 12 by a continuous weld extending circumferentially around the ends of the tubular case 12. The preferred method of welding utilizes a tungsten inert gas welding process, although other types of welds are contemplated.

In particular, a continuous, circumferential end cap weld 17 is provided, as illustrated, at the interface of a pair of flanges 17a, 17b, provided respectively by the end cap 14 and the adjacent end of the tubular case 12. The flange 17b is defined by an inwardly extending, radial groove 15 machined circumferentially about the tubular case 12, the groove 15 constituting a thermal barrier to enhance rapid heating of the flanges 17a, 17b due to the groove 15 limiting the rate of heat transfer from the weld area. The weld 17 at the interface of the flanges 17a and 17b hermetically seals the end cap 14 to the end of the tubular case 12.

The window assembly 20 is hermetically joined to the other end of the tubular case 12 by the welding together of a pair of flanges 23a, 23b to establish a circumferentially extending, continuous weld 23. The flange 23a is provided by the window end of the tubular case 12 as defined by circumferentially extending thermal barrier grooves 18 corresponding in function to the groove 15 discussed earlier. In addition to the thermal barrier groove 18, the window assembly 20, and in particular the window-retaining ring 22, is provided with an annular thermal barrier slot or groove 21 extending inwardly along lines parallel to the longitudinal axis of the case 12, the groove 21 interposed between the glass window 24 and the seam weld 23. The purpose of the grooves 18 and 21 is to limit the rate of heat transfer from the heated flanges 23a and 23b during the welding process. A more detailed disclosure of the welding process for fastening the window assembly 20 and the end cap 14 to the ends of the tubular case 12 is disclosed in copending application Ser. No. 192,540, filed Sept. 30, 1980.

Coaxially mounted within the tubular case 12, and equidistantly spaced from the inner diameter sidewalls thereof, is a cylindrical, longitudinally extending scintillation crystal of, for example, an alkali metal halide type. The crystal 30 is preferably a high purity thallium activated sodium iodide and is cut or machined to provide a smooth, cylindrical external surface and flat, parallel end faces. The crystal 30 has a longitudinal axis 31 and includes a first circular end face 34 adjacent the window assembly 20 and a second circular end face 32 adjacent a spring-biasing means 40, such spring-biasing means 40 serving to push or force the crystal 30 towards the window assembly 20 to maintain optical coupling between the crystal 30 and the window 24 via a layer of suitable optical coupling material 36 to be hereafter discussed in more detail. The crystal 30 is held in a centered, coaxial position within the tubular case 12 by a shock-absorbing, light-reflecting packing of, for example, powdered aluminum oxide 33 located as an annularly extending layer between the crystal 30 and the case 12.

In the preferred illustrated form, the spring-biasing means 40 includes a scintillating light reflecting backplate 42 abutting the second end face 32 of the crystal 30. Between the backplate 42 and the inner end wall 14a of the end cap 14 are three pairs of Belleville-type spring assemblies separated from each other in alternating fashion by spacer plates 44. The Belleville spring pairs each include opposed, convex spring members 46. The spacer plates 44 alternate in position with the spring pairs 46 to constitute the biasing spring means 40. It is noted that while Belleville-type springs are illustrated, other suitable types of springs, such as a wave spring or the like, are contemplated.

The first end face 34 of the cylindrical crystal 30 is optically coupled to the inner face of the window 24 by the optical couplant layer 36 which forms a semirigid or rigid layer between the end face 34 and the glass window 24. A suitable optical couplant layer 36 may be of the type disclosed in U.S. Pat. No. 3,426,195. The optical coupling materials include certain epoxy resins, silicon oils, silicone greases, and silicon rubbers as disclosed in said patent.

With particular reference to FIG. 2, a detailed discussion of the improved window assembly in accordance with the present invention follows.

In a preferred form, the window 24 is formed of a glass material generally transparent to the type of light generated by the associated scintillation crystal 30 under bombardment from ionizing radiation. Special optical glass is available commercially which may be used to form the window 24 including Schott UBK7. The UBK7 glass has a transmission of about 98 percent at 4200 Angstroms and a thermal coefficient of expansion of about 0.0000083 inch per inch per degree centigrade. Other suitable glasses or glass equivalents may be employed. They should have superior transparency at the wave lengths emitted by the crystal, bond well to epoxy, and have a relatively high coefficient of expansion.

The window 24 is hermetically bonded to the window-retaining ring 22 to form the preassembled window assembly 20 prior to the mounting and welding of the retainer ring 22 to the window end of the tubular case 12. The retaining ring 22 is preferably formed of a stainless steel type, such as Type 430 or 446, matched from a coefficient of thermal expansion standpoint to the window 24 and the epoxy adhesive composition 26. The window 24 is in the form of a shallow, truncated cone having parallel end faces 24a, 24b, the base end or inner face 24b being of a larger diameter than the other apex end or other face 24a, constituting an exterior portion of the window assembly end of the scintillation detector. The faces 24a, 24b are separated from each other by a sloped edge wall 24c, which is equidistantly spaced at all points from an apposed inner diameter sloped wall 22a of the retaining ring 22, the wall 22a defining a tapered, smooth-wall bore. It is to be noted that the term "smooth-wall bore" is intended to include a tapered bore defined by surface (e.g., that may be roughened or matted to a slight degree to enhance adhesion of the epoxy composition 26 thereto). For example, the sloped wall 22a of the retaining ring may be roughened or matted to enhance its adhesion capabilities relative to the epoxy composition 26. The wall 22a lies along lines 31a that intersect the longitudinal axis 31 of the crystal 30 at a common point exterior of the casing 12 at its window end, as can be seen in FIG. 1. Interposed between the edge wall 24c and the inner diameter wall 22a is an epoxy adhesive composition 26 constituting an annular frustoconical hermetic seal of rhomboid-shaped cross section having a length substantially greater than its constant width t, as illustrated in FIG. 2. The window 24 is held in position and maintained in spaced relation from the retaining ring 22 solely by the epoxy adhesive composition 26. The epoxy must be impervious to water and can be rigid composition 26, or it is preferably tough and capable of slight deformation. A semirigid, or even a flexible, epoxy resin can be used provided it has the required resistance to permeation by water vapor, the necessary heat resistance, and maintains the structural integrity of the unit. The cured epoxy adhesive composition should be resistant to temperatures of 200° C. or higher, should have a linear coefficient of thermal expansion in the range of 0.000045 to 0.000065 inch per inch per degree C., and should have a very low water vapor permeability, below 0.001 preferably from about 0.0001 to about 0.0005 gram per square foot per hour per inch. It must also adhere to the window 24 and ring 22. Best results can be obtained with a tough epoxy resin composition with high resistance to permeation by water vapor and a suitable coefficient of expansion.

A suitable high-temperature epoxy adhesive paste is Epoxylite No. 810 made by The Epoxylite Corporation. This is a 100 percent solids system employing a liquid epoxy compound and a dry powder curing agent. When the ingredients are mixed, a thick paste is formed which is pressed into the space between the walls 22a of the ring 22 and the edge wall 24c of the window 24. The material gels at room temperature in a short period of time, such as 20 minutes or less, depending on the amount of curing agent used or the amount of the accelerator used, if any, and may be post-cured by heat for 2 hours or more (for example, 2 hours at 300° F. or 4 hours at 250° F.). The cured adhesive is hard, but has fair resistance to impact and vibration. The thermal coefficient of expansion is about 0.000042 inch per inch per degree C. and the water vapor permeability is around 0.0004 gram per square foot per hour per inch.

Because the Epoxylite 810 is applied in the form of a paste, it does not flow readily and does not leak from between the window 24 and the retaining ring 22. It is preferable to employ an epoxy resin composition which when mixed is in the form of a paste or which will gel or thicken to a paste-like consistency and which will adhere well to glass and to metal when applied as such a paste. Additional details regarding a suitable epoxy adhesive composition are contained in hereinbefore incorporated U.S. Pat. No. 4,004,151.

With the window 24 nested within and bonded to the retainer ring 22, the window assembly 20 is set into and received by the end of the case 12, an outer diameter portion 22b of the ring 22 being slightly less than the inner diameter of the tubular case 12. The window assembly 20 is pushed into the window end of the case 12 until the flange 23b abuts the corresponding flange 23a provided by the housing end 12, as earlier discussed. With the window assembly 20 in position, a tungsten inert gas welding process is utilized to provide the continuous weld 23 about the circumferential extent of the case 12 at its window assembly end. Since bonding to the window 24 to the ring 22 is provided prior to the insertion of the window assembly 20 into the end of the tubular case 12, the cured epoxy adhesive composition 26 does not adhere to the adjacent layer of aluminum oxide packing 33, the diameter of the crystal end face 34 being generally equal to the diameter of the inner face 24b of the window 24, as illustrated most clearly in FIG. 1.

It can be seen that movement of the crystal end face 34 towards the larger diameter face 24b of the window 24 during thermal expansion of the crystal will tend to force the truncated cone-shaped window 24 further into the tapered smooth-wall bore defined by the inner diameter wall 22a, such forcing action applying a generally equal compressive force to epoxy adhesive composition 26 of constant thickness throughout its annular extent. This equally applied compressive force advantageously maintains the hermetic integrity on the adhesive epoxy composition 26, which is of an optimal thickness in the range of 0.010 to 0.040 of an inch. It has been determined that for a typical epoxy adhesive composition, a relatively thin layer of such material is stronger than a relatively thick layer. Thus, in accordance with the invention, an optimized thin adhesive layer is used.

It has been found that the window assembly 20, in accordance with the present invention, can better withstand the forces applied by the expanding scintillation crystal 30 within the tubular case 12 in the window assemblies of the prior art, and in particular to the window assembly illustrated by the heretofore incorporated patent. Further, the assembly 20 is easier to manufacture and it is less costly than prior art epoxy-bonded scintillation detector window assemblies.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A scintillation detector window assembly for hermetically closing one end of a tubular case housing a cylindrical scintillation crystal coaxial with the case, comprising:

a window retaining ring having an inner diameter surface defining a tapered smooth-wall bore;

a window generally transparent to light generated by the crystal under bombardment from ionizing radiation, the window being in the form of a shallow, truncated cone nested within the tapered bore of the retaining ring, the window having circular faces parallel to each other, one face having a diameter larger than the other, the peripheries of the faces being separated by an edge wall surface equidistantly spaced at all points from the inner diameter surface defining the tapered smooth-wall bore of the retaining ring, the diameter of the one face being greater than the smallest diameter of the tapered smooth-wall bore; and a heat-resistant epoxy adhesive composition filling at least an annular portion of the space between the edge wall surface of the window and the inner diameter surface of the tapered smooth-wall bore to hermetically bond and seal the window to the retaining ring.

2. A window assembly according to claim 1, wherein the distance between the edge wall surface of the window and the inner diameter surface of the tapered smooth-wall bore is within the range of 0.010 to 0.040 of an inch to optimize the strength capabilities of the epoxy adhesive composition utilized.

3. A window assembly according to claim 1, wherein the retaining ring and the window have generally equal coefficients of thermal expansion.

4. A window assembly according to claim 1, wherein a compressive force applied to the larger diameter face of the window causes a compression force component to be applied to the epoxy adhesive composition to aid in maintaining its hermetic sealing ability.

5. A window assembly according to claim 4, wherein the compressive force component is evenly distributed over the extent of the epoxy adhesive composition between the window and the retaining ring.

6. A hermetically sealed scintillation detector for measuring radiation at successive depths in a bore hole comprising:
- a tubular metal case having one end hermetically closed by a metal end cap and the other end hermetically closed by a window assembly;
- an alkali metal halide scintillation crystal shaped into an elongated cylinder of a diameter less than the inner diameter of the housing, the crystal being coaxially oriented within the case and having generally flat end faces parallel to each other and perpendicular to the longitudinal axis of the crystal, the cylindrical wall of the crystal being separated from the inner wall of the tubular metal by shock-absorbing, light-reflecting packing material;
- spring-biasing means located between the metal end cap of the housing and the end face of the crystal closest to the end cap, the spring-biasing means forcing the crystal toward the window assembly;
- the window assembly having a retaining ring with an inner diameter surface defining a tapered smooth-wall bore, the inner diameter surface lying along lines intersecting the longitudinal axis of the cylindrical crystal at a common point exterior to the casing at its window end, the assembly including a solid glass window generally transparent to light generated by the crystal under bombardment from ionizing radiation, the window being in the form of a shallow, truncated cone nested within the tapered bore of the retaining ring, the window having circular faces parallel to each other and perpendicular to the longitudinal axis of the crystal, one face having a diameter longer than the other, the peripheries of the faces being separated by a sloped edge wall surface equidistantly spaced at all points from the inner diameter surface defining the tapered smooth-wall bore of the retaining ring, the diameter of the one face being greater than the smallest diameter of the tapered smooth-wall bore; and
- a heat-resistant epoxy adhesive composition filling at least an annular portion of the space between the edge wall surface of the window and the inner diameter surface of the tapered smooth-wall bore to hermetically bond the window to the ring, the larger diameter face of the window being adjacent to the crystal, the other face of the window constituting an exterior end portion of the detector, the spring-biasing means applying, via the crystal, a compression force to the larger diameter face of the window wherein a compression force component is applied to the epoxy composition to aid in maintaining its hermetic integrity under adverse temperature conditions.

7. A scintillation detector according to claim 6, wherein the window does not contact the tubular casing, the window being held in position and maintained in spaced relation from the retaining ring solely by the epoxy composition.

8. A scintillation detector according to claim 6, wherein the packing material is aluminum oxide powder in contact with but not bonded to the epoxy composition between the window and the retaining ring.

9. A scintillation detector according to claim 6, wherein upon heating of the crystal the crystal expands at least along its longitudinal axis to apply a compression force to the larger diameter face of the window in addition to the compression force normally applied to the window by the spring-biasing means, the additional compression force provided by the expanding crystal increasing the compression force component applied to the epoxy composition to maintain its hermetic integrity at elevated temperatures of the scintillation crystal.

10. A scintillation detector according to claim 6, wherein the epoxy composition forms an annular frustoconical shaped seal of constant wall thickness and of rhomboid-shaped cross section of substantially greater length than width, interposed between the edge of the glass window and the retaining ring within which the glass window is nested, the larger diameter face of the glass window having a diameter greater than the smallest diameter of the tapered smooth-wall bore wherein a perpendicular force component applied to the larger diameter face to force it towards the smaller diameter annular area of the bore compresses the frustoconical shaped seal formed by the epoxy composition.

* * * * *